United States Patent
de Mello Brandao et al.

(10) Patent No.: US 10,887,656 B2
(45) Date of Patent: Jan. 5, 2021

(54) AUTOMATIC CONTENT PRESENTATION ADAPTATION BASED ON AUDIENCE

(71) Applicant: INTERNATIONAL BUSINESS MACHINES CORPORATION, Armonk, NY (US)

(72) Inventors: Rafael Rossi de Mello Brandao, Botafogo (BR); Marcio Ferreira Moreno, Rio de Janeiro (BR); Renato Fontoura de Gusmão Cerqueira, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/035,620

(22) Filed: Jul. 14, 2018

(65) Prior Publication Data
US 2020/0021888 A1 Jan. 16, 2020

(51) Int. Cl.
*H04N 7/16* (2011.01)
*H04N 7/10* (2006.01)
(Continued)

(52) U.S. Cl.
CPC ......... *H04N 21/4756* (2013.01); *G06F 40/40* (2020.01); *G06K 9/00288* (2013.01);
(Continued)

(58) Field of Classification Search
None
See application file for complete search history.

(56) References Cited

U.S. PATENT DOCUMENTS 5,757,417 A * 5/1998 Aras ................... H04N 7/17318
348/569
6,678,332 B1 * 1/2004 Gardere ........... H04N 21/23424
348/705

(Continued)

FOREIGN PATENT DOCUMENTS

| CN | 102129644 A | 7/2011 |
| CN | 104394436 A | 3/2015 |

OTHER PUBLICATIONS

Bahari, M. H. et al., "Speaker Age Estimation and Gender Detection Based on Supervised Non-Negative Matrix Factorization"; IEEE (2011); 6 pgs.

(Continued)

*Primary Examiner* — William J Kim
(74) *Attorney, Agent, or Firm* — Intelletek Law Group, PLLC; Gabriel Daniel, Esq.

(57) ABSTRACT

A method and system of dynamically adapting a streaming media content are provided. A user device determines a class of each member of its audience. Streaming media content is received. The streaming media content is monitored to dynamically determine a rating of each segment of the streaming media content. For each segment of the streaming media content, upon determining that a rating of a segment is above a class of a most restricted member of the audience, one or more portions of the segment are adapted to alter the rating of the segment to the class of the most restricted member of the audience. The segment of the media content is then presented on a user interface of the user device.

18 Claims, 7 Drawing Sheets

(51) Int. Cl.
- *H04N 7/025* (2006.01)
- *H04N 21/475* (2011.01)
- *H04N 21/466* (2011.01)
- *H04N 21/442* (2011.01)
- *G06K 9/00* (2006.01)
- *G06F 40/40* (2020.01)

(52) U.S. Cl.
CPC ... *G06K 9/00335* (2013.01); *H04N 21/44218* (2013.01); *H04N 21/4668* (2013.01)

(56) References Cited

U.S. PATENT DOCUMENTS

| | | | |
|---|---|---|---|
| 7,363,643 B2 | 4/2008 | Drake et al. | |
| 8,079,044 B1* | 12/2011 | Craner | H04N 21/4532 725/28 |
| 8,793,721 B1* | 7/2014 | Sharkey | H04N 21/44029 725/25 |
| 8,850,469 B1* | 9/2014 | Yang | H04N 21/25841 725/135 |
| 9,832,507 B2* | 11/2017 | Le Nerriec | H04L 45/16 |
| 2002/0078441 A1 | 6/2002 | Drake et al. | |
| 2002/0147782 A1* | 10/2002 | Dimitrova | H04N 7/163 709/207 |
| 2003/0028875 A1* | 2/2003 | Piotrowski | H04N 7/0887 725/38 |
| 2004/0244058 A1* | 12/2004 | Carlucci | G06F 3/0482 725/135 |
| 2004/0250272 A1* | 12/2004 | Durden | H04N 7/163 725/25 |
| 2004/0261099 A1* | 12/2004 | Durden | H04N 7/163 725/32 |
| 2005/0066357 A1 | 3/2005 | Ryal | |
| 2006/0130118 A1* | 6/2006 | Damm | H04L 63/0245 725/135 |
| 2006/0130119 A1 | 6/2006 | Candelore et al. | |
| 2006/0130121 A1 | 6/2006 | Candelore et al. | |
| 2006/0277565 A1* | 12/2006 | Long | H04N 7/163 725/28 |
| 2007/0130585 A1 | 6/2007 | Perret et al. | |
| 2009/0091655 A1* | 4/2009 | Russell | H04N 21/2368 348/515 |
| 2009/0133051 A1* | 5/2009 | Hildreth | H04N 5/4403 725/28 |
| 2010/0011389 A1 | 1/2010 | Lee et al. | |
| 2010/0287584 A1* | 11/2010 | Starikov | H04N 7/163 725/28 |
| 2011/0015989 A1 | 1/2011 | Tidwell et al. | |
| 2011/0072452 A1* | 3/2011 | Shimy | H04N 7/163 725/25 |
| 2012/0117069 A1* | 5/2012 | Kawanishi | G06K 9/00664 707/740 |
| 2012/0127365 A1* | 5/2012 | Cooper | H04S 5/005 348/515 |
| 2012/0311625 A1* | 12/2012 | Nandi | H04N 21/23418 725/28 |
| 2013/0141643 A1* | 6/2013 | Carson | H04N 21/4307 348/515 |
| 2015/0095014 A1* | 4/2015 | Marimuthu | G06F 17/2735 704/9 |
| 2016/0182949 A1* | 6/2016 | Fung | H04N 21/25825 725/28 |
| 2018/0288431 A1* | 10/2018 | Liu | H04N 19/521 |
| 2018/0359477 A1* | 12/2018 | Yang | H04N 19/136 |

OTHER PUBLICATIONS

Chaudhari, S. et al., "A Review of Automatic Speaker Age Classification, Recognition and Identifying Speaker Emotion Using Voice Signal"; International Journal of Science and Research (2014); vol. 3:11; pp. 1307-1311.

Farre, M. et al., "Automatic Content Creation for Multiview Autostereoscopic Displays using image Domain Warping" IEEE (2011); 6 pgs.

Feld, M. et al., "Automatic Speaker Age and Gender Recognition in the Car for Tailoring Dialog and Mobile Services"; Interspeech (2010); pp. 2834-2837.

Gauthier, J. "Conditional Generative Adversarial Nets for Convolutional Face Generation"; Stanford University; https://github.com/hans/adversarial; 9 pgs.

Li, C. et al., "Precomputed Real-Time Texture Synthesis with Markovian Generative Adversarial Networks", arXiv:1604.04382v1 [cs.CV] (2016); 17 pgs.

Mordvintsev, A. et al. "Inceptionism: Going Deeper into Neural Networks"; Google Al Blog (2015); 9 pgs.

Moreno, M. et al., "Method and System to Automatically Profile Speakers in Real-Time Through Media Processing with Dialog Understanding Supported by AI Techniques"; IBM Corporation (2018); 17 pgs.

Moreno, M. et al. "System and Method to Assist Content Rating Classification with Cognitive Computing"; IBM Corporation (2016); 11 pgs.

Zhang, L. "3D-TV Content Creation: Automatic 2D-to-3D Video Conversion", IEEE Transactions on Broadcasting (2011); vol. 57:2; pp. 372-383.

\* cited by examiner

AUTOMATIC CONTENT PRESENTATION ADAPTATION BASED ON AUDIENCE

BACKGROUND

Technical Field

The present disclosure generally relates to computers and computer applications, and more particularly, to automatic scene by scene adaptation of media content based on an identified audience.

Description of the Related Art

In recent years, media content has become ubiquitous in that it is available on various platforms and from an increasing number of sources. Often, media content is conceived and tailored to a specific audience type (e.g., based on audience maturity), referred to herein as a rating, to conform with audiovisual publication and/or marketing regulations. The rating can then be altered to accommodate different audiences. For example, scenes that may be deemed to be above the class of an audience can be modified in advance (e.g., before broadcast), to accommodate an audience with a lower maturity rating.

In some scenarios, the display device is configured to block content that is above a threshold rating. For example, the receiver of a display device may be equipped with a computer chip, sometimes referred to a V-chip, which can be programmed by a user to block or scramble content that includes a signature code indicating that it is deemed violent or graphically explicit. Such approaches tend to be binary in nature, in that a viewer can view the entire program or not. Stated differently, traditional media restriction devices typically do not provide intermediate levels of blocking or content adaptation.

SUMMARY

According to various exemplary embodiments, a computing device, a non-transitory computer readable storage medium, and a method are provided to dynamically adapt a streaming media content. A class of each member of an audience of the user device is determined. The streaming media content is received and monitored to dynamically determine a rating of each segment. For each segment of the streaming media content, upon determining that a rating of a segment is above a class of a most restricted member of the audience, one or more portions of the segment are adapted to alter the rating of the segment to the class of the most restricted member of the audience. The segment of the media content is presented on a display of a user device.

In one embodiment, the determining the class of each member of the audience includes using one or more sensors of the user device to determine one or more individuals within a viewing angle of a display of the user device.

In one embodiment, upon determining that a member of the present audience has left a viewing angle or an audio range of the user device, the process returns to determining the class of each member of the audience of the user device.

In one embodiment, determining the class of each member of the audience includes using one or more sensors of the user device to determine one or more individuals within an audible range of the user device, extracting audio features from a recorded audio content of the audience member and performing natural language processing (NLP) to the audio content.

In one embodiment, adapting one or more portions of the segment to the most restricted class member includes using generative adversarial network (GAN) artificial intelligence (AI) to create synthetic content to replace the one or more portions of the segment.

In one embodiment, upon determining that a rating of a segment is below the class of a most restricted member of the audience, one or more portions of the segment are adapted to enhance its content to a higher rating.

In one embodiment, determining a rating of each segment of the streaming media content includes using a discriminator network to classify the segment.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
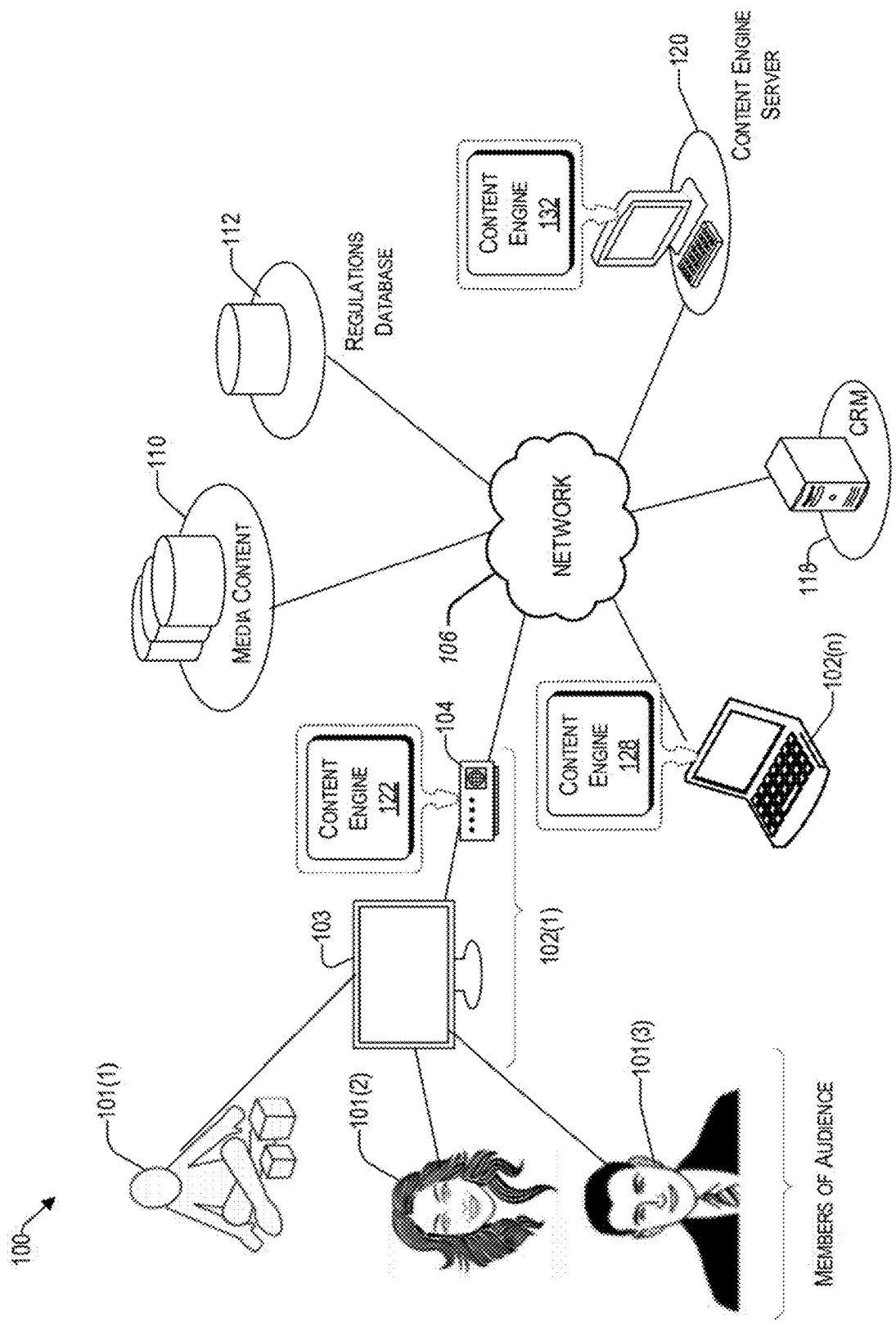
FIG. 1 is an example architecture for implementing a system that determines a class of each member of the audience and dynamically adapts the media content accordingly, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to automatic and dynamic scene by scene adaptation of media content based on identified members of the audience. Today, media content is provided by various sources, including broadcast or multicast from a content provider, such as a television station, radio station, social media, stored media (e.g., video and/or audio), and the like. Media content provided by television stations is typically rated by the TV Parental Guidelines Monitoring Board, which provides ratings of TV-Y, TV-Y7, TV-Y7-FV, TV-G, TV-14, and TV-MA, to provide insight to the appropriate maturity level of the potential audience. Movies may have an associated content rating established by a regulatory entity to advise potential members of an audience of the type of material that may be part of the content. For example, ratings of G, PG, PG-13, R, and NC-17 are usually provided for movies produced in the United States by the Classification and Ratings Administration (CARA) of the Motion Picture Association (MPA) or the Motion Picture Association of America (MPAA), to indicate the appropriate maturity level of the audience. The different classifications of the above different rating systems (and other similar rating systems) are collectively referred to herein as a "rating," for simplicity. Accordingly, the term "rating" includes any appropriate content rating system, domestic or foreign, public, private or governmental that provides a similar function. In some scenarios, such rating information is provided as metadata embedded in the digital media stream (e.g., movie) when it is transmitted.

As used herein, media content is referred to herein as having a "higher" rating if it is intended for a more mature audience, and a "lower" rating if it is intended for a more general (or less mature) audience. For example, an R rating is a "higher" rating than a G rating. Such nomenclature is used herein for simplicity of description of the different rating systems.

Presently, movies are rated in whole, where the most intense (e.g., violent or explicit) scenes dictate the rating of the movie. Thus, even though substantial segments of a movie may be appropriate for a more general audience, one or more scenes may be sufficient to render the movie to be inappropriate for certain members of the audience.

In some scenarios, forms of media content, such as that offered by social media, may not include a predefined rating. Still further, the way media content is rated may be considered subjective. For example, some parents may find assigned ratings to be inconsistent with their views or beliefs. Scenes with violence (e.g., human combat) may receive a higher rating than scenes with drug use or indecent language, while other parents may believe in the opposite.

In one aspect, the present disclosure uses capture devices to dynamically detect and sense the members of an audience. The type, sometimes referred to herein as a class, of each member of the audience is categorized based on their age and/or maturity level. Based on the determined class of members in the audience, the appropriate type of media content rating is determined. Upon determining that a rating of a segment is above the class of a most restricted member of the audience, one or more portions of the segment are adapted to accommodate a class of the most restricted member of the audience.

In one aspect, by virtue of the concepts discussed herein, segments of a media content may be dynamically adapted on-the-fly (e.g., in near real time), thereby automatically increasing the range of the members of the audience, regardless of the original media content.

In one aspect, data from one or more capture devices is used in artificial intelligence (AI) architectures to detect and sense the audience (e.g., in situ) to identify the class of each member of the audience.

In one embodiment, content can be adapted both to reduce-rate or enhance-rate various portions thereof, based on user preferences. For instance, content created for children, could be enriched with more complex features (e.g., video, images, or sound) and language (text or audio) upon determining that no children are present.

The techniques described herein may be implemented in a number of ways. Example implementations are provided below with reference to the following figures.

Example Architecture

FIG. 1 is an example architecture 100 for implementing a system that determines a class of each member of the audience and dynamically adapts the media content accordingly, consistent with an illustrative embodiment. Architecture 100 includes a network 106 that allows various user devices 102(1) to 102(n) to communicate with various components that are connected to the network 106, such as one or more media content source(s) 110, a regulations database 112, and a customer relations management (CRM) server 118.

The network 106 may be, without limitation, a local area network ("LAN"), a virtual private network ("VPN"), a cellular network, the Internet, a cable network, digital satellite TV network, or a combination thereof. For example, the network 106 may include a mobile network that is communicatively coupled to a private network, sometimes referred to as an intranet, which provides various ancillary services, such as communication with various media content sources, databases, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows users of the user devices 102(1) to 102(n) to receive content from one or more media content sources 110. In some scenarios, the communication is in both directions, in that the user device can receive information from various components connected to the network, but also send information thereto.

For purposes of later discussion, several user devices appear in the drawing, to represent some examples of the devices that may receive media content via the network 106. In some embodiments, the user device may be independent from the network in that it has the media content stored in its memory (e.g., hard disk, RAM, ROM, DVD, video tape, flash drive, etc.) Today, user device's typically take the form of portable handsets, smart-phones, tablet computers, personal digital assistants (PDAs), smart watches, and laptops, although they may be implemented in other form factors, including display devices 103 coupled to set top boxes or gaming consoles, collectively represented herein as digital device 104. The user devices discussed herein allow the members of the audience 101(1) to 101(3) to receive various types of content (e.g., video broadcasts such as single-channel or multi-channel television programming, single-channel or multi-channel audio broadcasts, audio-on-demand, video-on-demand, etc.,) from their user device (e.g., 102(1)) and to interact with the content and with related services in various ways.

Accordingly, a user device may refer to a platform, such as a television that has or is coupled to a digital device 104 that is adapted to tune, receive, decrypt, descramble and/or decode transmissions from one or more content providers, such as media content source 110. Examples of a media content source 110 may include, without limitation, a terrestrial broadcaster, a cable or satellite television distribution system, or a company providing content for download over the Internet or other Internet Protocol (IP) based networks like an Internet service provider.

A user device (e.g., 102(1) or 102(n)) may have various applications and/or media content stored in its memory that may have been downloaded from various sources, represented herein by media content source 110. For example, some of the content provided by the media content source 110 may include pictures, videos, and music.

Each user device subscribed to the dynamic adaption of media content services described herein (e.g., 102(1) to 102(n)), includes a module (which may be implemented in hardware, software, or a combination thereof), referred to herein as the content engine (e.g., 122 or 128). The content engine (e.g., 122) is operative to perform various functions, including without limitation, to determine a class of each member of the audience and dynamically adapt the media content, based on the class of the member having a highest restriction (e.g., youngest member).

In one embodiment, for each segment of a media content, a content engine (e.g., 122, 128, or 132) can provide a scene-by-scene adaptation of the media content. In some embodiments, the adaptation may be to a granularity of a single frame, to block or replace individual scenes, wounds, and/or words in near real time. In various embodiments, such dynamic adaptation may be accomplished by the content engine (e.g., 122 for user device 102(1), and 128 for user device 102(n)) by way of blocking, obscuring, or generating new content for a particular portion of a segment of the media.

For example, portions of the visual content of segment deemed to be rated above a threshold of a class of a member of the audience (e.g., a child), can be obscured by covering up or blurring the relevant portions. Audio content can be bleeped or muted. In other embodiments, portions of the visual content of a segment deemed to be rated above a threshold of a class of a member of the audience can be replaced with synthetic content that is appropriate for the most restricted class of the member of the audience. The generation of the synthetic content by way of artificial intelligence (AI) is discussed in more detail later.

Accordingly, content within the scene can be adapted to reduce the rating of the media, referred to herein as "reduce-rating." In some scenarios, content within a scene can also be escalated to a higher rating, referred to herein as "enhance-rating." The enhanced rating may be achieved, by replacing portions of the content with media material that has a higher rating. By way of example, volume can be increased in fight scenes, the language can be made coarser, explosions can be amplified in magnitude, and the like.

Each user device is configured to determine the class of each member of the audience 101(1) to 101(3) by way of various sensors, which may include, without limitation, one or more cameras and microphones. Example sensors are discussed in more detail in a later section. In the example of FIG. 1, a child 101(1) an adult female 101(2), and a male adult 101(3) are members of the audience for user device 102(1). The digital device 104 of the user device 102(1) may use one or more cameras to extract physical features from each member's face and or body. For example, a 2-Dimensional or 3-Dimensional facial recognition algorithms may analyze the relative position, shape, and/or size of the nose, eyes, jaw, cheekbones, etc., to determine (i) a class and/or (ii) an identity of each member of the audience. In some embodiments, audio features of each member of the audience may be analyzed in addition to or instead of the physical features.

The analysis of the audio portion may include at least one of: (i) an audio features extraction component or processing for speaker identification (ID) recognition; (ii) a dialog understanding through natural language processing; and (iii) knowledge graph representation from the dialog. In some embodiments, the audio signal of the participants is categorized so that it is possible to identify its source and also to enable the dialog transcription, which is fed via natural language processing (NLP) for the dialog understanding component. In some embodiments, the conversation is then structured in knowledge graphs, which makes possible to associate the class and/or names of the members of the audience during a natural conversation exchange between these members, or upon a prompt by the content engine to recite a predetermined phrase.

In some embodiments, the audio signals harvested by the one or more sensors are also used to convert the speech to text. The information included in the audio can be used computationally when the speech is transformed to text and the information included in the text is processed, e.g., by NLP, to be labeled and associated with a class of the member of the audience.

In one embodiment, the content engine 122 uses NLP to process the raw natural language content of the verbal queues of each member of the audience 101(1) to 101(3). The content engine 122 can perform speech recognition to determine the textual representation thereof. In natural speech, there may not be discernable pauses between successive words. To that end, speech segmentation may be performed to separate the words into meaningful sentences.

In one embodiment, concept expansion, such as the IBM Watson concept expansion, can be used to identify the concept cues in the speech of each member of the audience 101(1) to 101(3). In this regard, large sets of unstructured sets of data may be provided to the conversation agent 103, such that it can learn therefrom. The large sets of unstructured data may relate to prior conversations that are consistent with different classes of audience, which now acts as a corpus of data to learn from. In one embodiment, such reference data may be provided by a reference database or server, such as the customer relations manager 118, discussed in more detail later.

Such concept expansion enables the creation of a specialized dictionary for the cognitive application of identifying the subject matter and scope of the communication of each member of the audience 101(1) to 101(3), collectively referred to herein as the "intent" of the communication. Concept expansion enables the content engine 122 to build a specialized dictionary for the cognitive application of rating the content of the conversation from each member of the audience 101(1) to 101(3) to determine its class. Accordingly, the content engine 122 can correctly understand specific terminology, local euphemisms, and colloquial terms that further aid in its identification of the class and/or identity of the member of the audience.

As mentioned above, in some embodiments, the content engine 122 is capable of not only classifying each member of the audience into a particular category, but also determining the members identity. To that end, the information harvested from the photo and/or audio sensors are used to be correlated to reference information stored in the CRM server 118. In various embodiments, the audio and or visual cues can be sent to the CRM to receive the identity of the user therefrom.

Thus, in some embodiments, there is a CRM server 118 that offers its account holders (e.g., subscribers to the content service) on-line access to a variety of information related to the user's account, such as reference digital signatures for audio and/or visual identification, preferences of each account holder, and the like. The preferences may be set by each member separately or by an account manager (e.g., a parent) who can override preferences of other members. For example, the account manager (e.g., 101(2)) may indicate what a default rating of the media content should be, whether media content that is to be reduce-rated by the content engine should be blocked or synthetically altered, under what situations the media should be enhance-rated, whether to change the rating when a class of the member of the audience leaves in the course of a presentation of a media content, etc.

In one embodiment, there is a regulations database 112 that is operative to store media content classification/rating rules for different regions. For example, the regulations database 112 may be maintained by a government agency or a consortium of organizations and/or individuals interested in providing ratings for different classes of audience. In one embodiment the regulations database 112 may override the user preferences identified in the CRM 118.

As mentioned above, in one embodiment, the content engine can dynamically change the rating level of a media content (e.g., reduce-rate or enhance-rate) based on the present audience. For example, during a movie, if the member of the audience that is of the most restricted class leaves the viewing angle of the display of the user device (as determined by the content engine) and/or the audio range of the user device, the content engine can change the rating accordingly, on-the-fly (e.g., in near real time). In some embodiments, the visual content of the media is not adapted, but the audio content is adapted, if a subject member of the audience is deemed not to be within visual range but within audio range. Similarly, the visual content of the media can be unaffected, but the audio portion be changed, if the subject member of the audience is deemed to be within audio range but not visual range.

While the functions of the content engines 122 and 128 have been discussed in the context of being integrated with (or in proximity to) user devices, in one embodiment, the functions of the content engine can be performed remotely (i.e., not by a user device that is proximate to one or more members of the audience, but by a remote server). For example, there may be a content engine server 120 that has a content engine 132 having features similar to those of the content engine 128 of user device 102(n). Thus, substantially similar functions to those of content engines 122 and 128 can be performed remotely over a network 106. This is particularly useful if a user device does not have sufficient computing resources (e.g., not enough processing power) and/or to conserve the power of the user device. Thus, in one aspect, the computing technology is improved by the concepts herein by being able to disburden a computing device by performing one or more media functions remotely.

While the media content database 110, the regulations database 112, content engine server 120 and the CRM 118 have been illustrated by way of example to be on different platforms, it will be understood that in various embodiments, their functionality described herein can be combined. In other embodiments, these computing platforms may be implemented by virtual computing devices in the form of virtual machines or software containers that are hosted in a cloud, thereby providing an elastic architecture for processing and storage.

Example User Device

Figure 2:
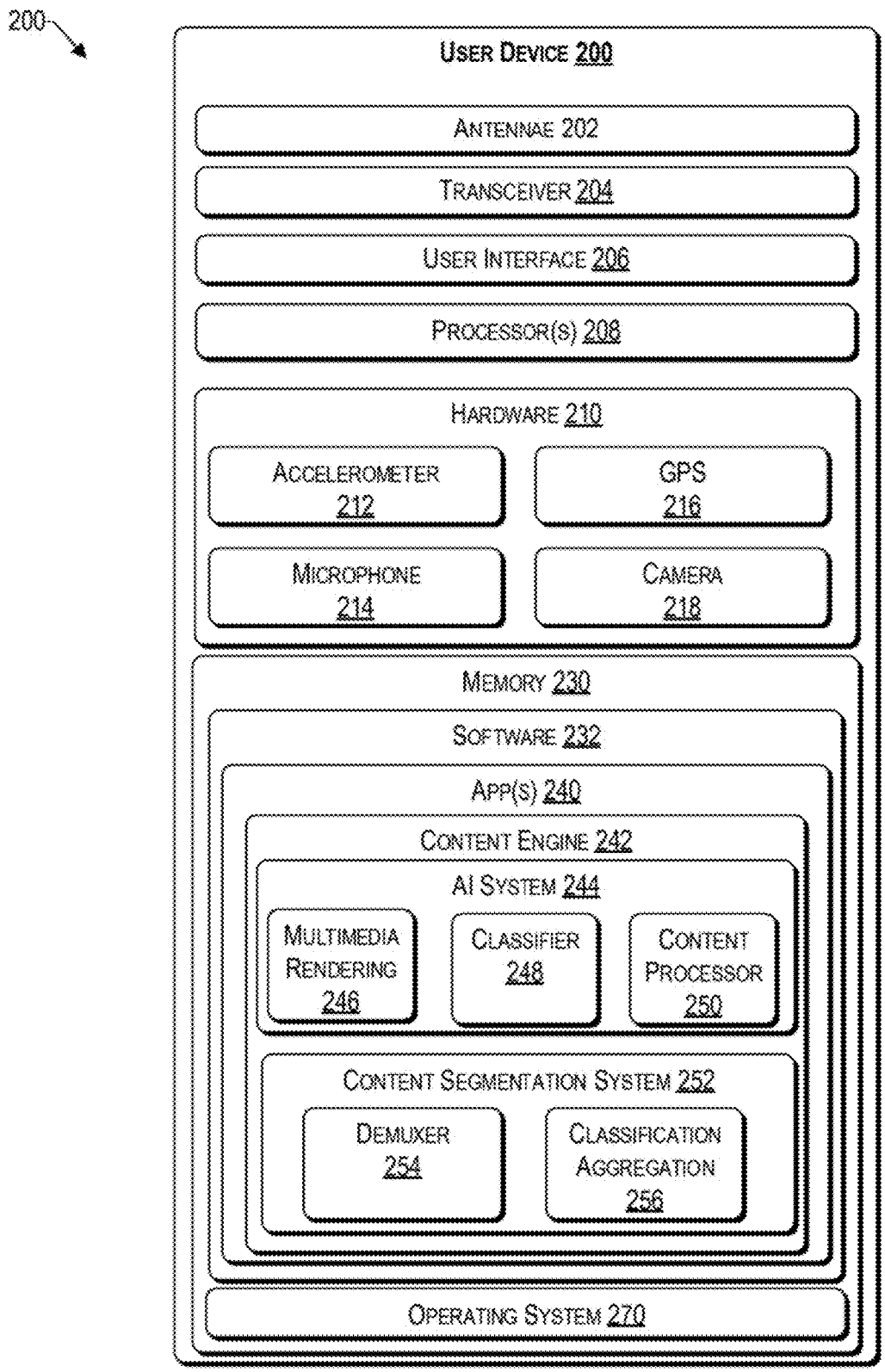
FIG. 2 illustrates a block diagram showing various components of an illustrative user device at a high level.

As discussed in the context of FIG. 1, the determination of class of each member of the audience and the dynamic adaptation of the media content may involve different types of user devices. To that end, FIG. 2 illustrates a block diagram showing various components of an illustrative user device 200 at a high level. For discussion purposes, the illustration shows the user device 200 in the form of a wireless computing device, while it will be understood that other computing devices are contemplated as well.

The user device 200 may include one or more antennae 202; a transceiver 204 for cellular, Wi-Fi communication, short-range communication technology, and/or wired communication; a user interface 206; one or more processors 208; hardware 210; and memory 230. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes one or more user interface(s) 206 that enables a user to provide input and receive output from the user device 200. For example, the user interface 206 may include a data output device (e.g., visual display(s), audio speakers, haptic device, etc.,) that may be used to provide content to one or more members of an audience based on their identified class rating.

The user interface(s) 206 may also include one or more data input devices. The data input devices may include, but are not limited to, combinations of one or more of keypads, knobs/controls, keyboards, touch screens, speech recognition packages, and any other suitable devices or other electronic/software selection interfaces.

The user device 200 may include one or more processors 208, which may be a single-core processor, a multi-core processor, a complex instruction set computing (CISC) processor, gaming processor, or any other type of suitable processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may include hardware decoders and encoders, a network interface controller, and/or a USB controller.

The hardware 210 may include various sensors that may be used to harvest information from the members of the audience who are proximate to the user device. For example, there may be one or more accelerometers 212 that are configured to measure acceleration forces, which may be used to determine an orientation of the user device 200. There may be one or more microphones 214 that may be used to identify a class and/or identity of each member of the audience of the user device 200.

The hardware 210 may further include a GPS sensor 216 that is operative to provide a location of the user device. The location of the user device can be used to determine the relevant restrictions to different class of members of the audience. The hardware 210 may include one or more cameras 218 to identify who is within a viewing angle and/or audio range of the user device, referred to herein as the members of the audience. The one or more cameras can also be used to identify a class and/or identity of each member of the audience.

The user device 200 includes memory 230 that may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 230 may store various software components or modules that are executable or accessible by the processor(s) 208 and controller(s) of the user device 200. The various components of the memory 230 may include software 232 and an operating system 270. The software 232 may include various applications 240, such as a content engine 242 having several modules, each configured to control a different aspect of the determination of the class of each member of the audience and the appropriate dynamic adaptation of the media content therefor. Each module may include routines, program instructions, objects, and/or data structures that perform tasks or implement abstract data types, discussed in more detail later.

In one embodiment, the content engine 242 comprises an artificial intelligence system 244 and a content segmentation system 252 that work together to implement various functions. The content segmentation system 252 may include a demuxer 254, sometimes referred to as a decomposer, for digital media files (i.e., the media content). The content segmentation system 252 is configured to segment and seamlessly recompose the new content during exhibition time, such that the members of the audience can experiment a smooth experience, even when the media content is being adapted on-the-fly.

The demuxer 254 is operative to demultiplex individual elementary streams of the media content (e.g., audio, video, and/or subtitles) and send them to their respective decoders for decoding.

The classification and aggregation module 256 module is operative to identify the class of each audience member. For example, it may use one or more artificial intelligence (AI) learning techniques, such as convolutional neural networks (CNN) and/or discriminator networks, discussed in more detail later.

In one embodiment, there is a regulations database (not shown), which may be instead of or in addition to the regulations database 112 of FIG. 1. As discussed above, the regulations database 112 stores content classification/rating rules that are used by legal regulators in various regions.

The artificial intelligence system 244 of the content engine 242 may include a multimedia rendering module 246, a classifier module 248, and a content processor module 250. The multimedia rendering module 246 relates to multimedia processing to present the adapted content that was created to meet the target audience class and/or their preferences.

The classifier module 248 is operative to determine the classification of the content and the classification of each member of the audience. To that end, in various embodiments, various identification techniques, such as convolutional neural networks (CNN) and/or a discriminator network may be used for such determination.

The Content Processor and Generation module 250 is operative to synthesize (i.e., create) new content (sometimes referred to herein as synthetic content), in real-time based on generative models, discussed in more detail later. For example, this module is capable of creating faces, expressions, new textures, and general images, based on statistical models. The classifier module 248 receives content from capture devices (e.g., sensors) present in the audience location. The classifier module 248 is based on statistical/predictive models and can handle the classification of audience, detect the viewer/group of viewers, and infer their age and maturity (and thus class). In one embodiment, the classifier module 248 classifies the audience members of the media content, through computer vision and neuro linguistic programming (NLP) techniques. By virtue of computer vision techniques, digital images can be processed, analyzed, and high-dimensional data can be extracted therefrom. While the modules of the content engine 242 are described above in the context of a software application, it is noted that one or more functions can be performed in hardware.

The operating system 270 may include components that enable the user device 200 to receive and transmit data via various interfaces (e.g., user controls, communication interface, and/or memory input/output devices), as well as process data using the processor(s) 208 to generate output. The operating system 270 may include a presentation component that presents the output (e.g., display at least part of the media content on an electronic display of the user device 200, store the data in memory 230, transmit the data to another electronic device, etc.) Additionally, the operating system 270 may include other components that perform various additional functions generally associated with an operating system 270. By virtue of the hardware and software of the user device 200, media content can be dynamically adapted to the members of the audience.

Example Artificial Intelligence Techniques

Figure 3A:
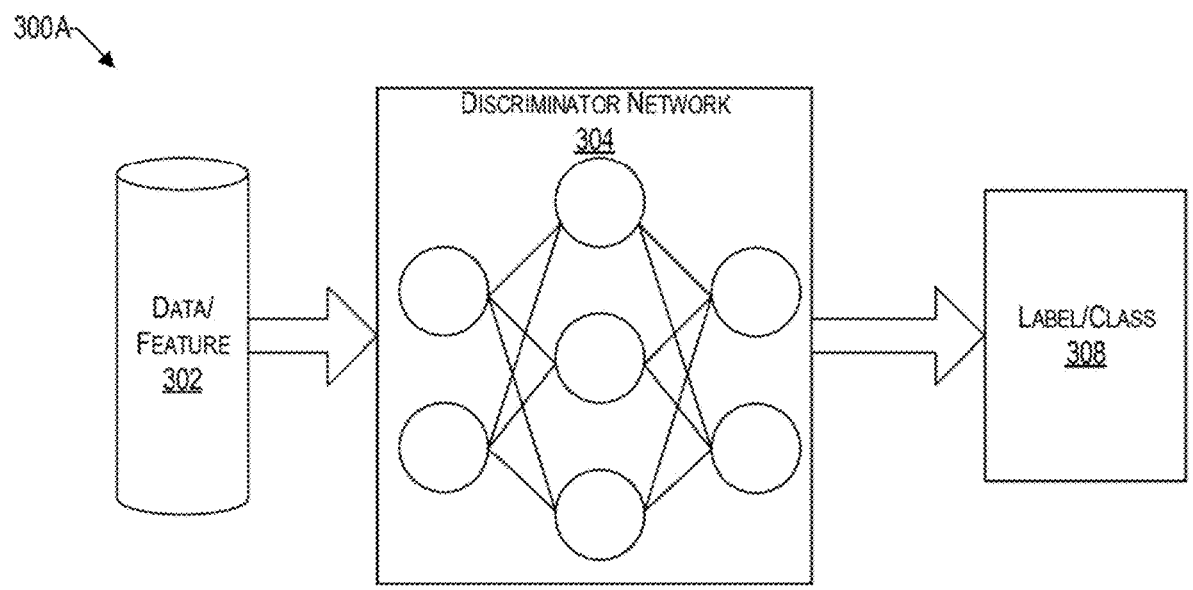
FIGS. 3A and 3B are example block diagrams of a discriminative and generative architectures, respectively.

As mentioned above, various artificial intelligence techniques can be used to identify the rating of the content of different segments of a media content, identify the class and/or identity of each member of the audience, and to provide synthetic portions of the media content based on the identified class of each member of the audience. In some embodiments, generative adversarial networks (GANs) and/or discriminative approaches can be used to identify the content of media. In this regard, FIGS. 3A and 3B are example block diagrams of a discriminative and generative architectures, respectively, which can be used to identify a class of each member of the audience, identify media content, and/or create media content.

Discriminator networks 204 can classify segments of input media content, represented by data/feature block 302, by predicting a label/class 308 to which that content belongs. For example, given the parsed words in a segment, a discriminator network 304 can determine the rating of the speech. Similarly, given a scene in a media segment, the discriminator network 304 can determine an appropriate rating (i.e., label/class 308) thereof.

Expressed mathematically, a label is referred to as y and the features are referred to as x. The expression $p(y|x)$ relates to "the probability of y given x." In view of the present example, the expression relates to "the probability that the content has a predetermined rating, given the words it includes in that segment." In this way, discriminative algorithms can map the features of a media segment to labels.

Figure 3B:
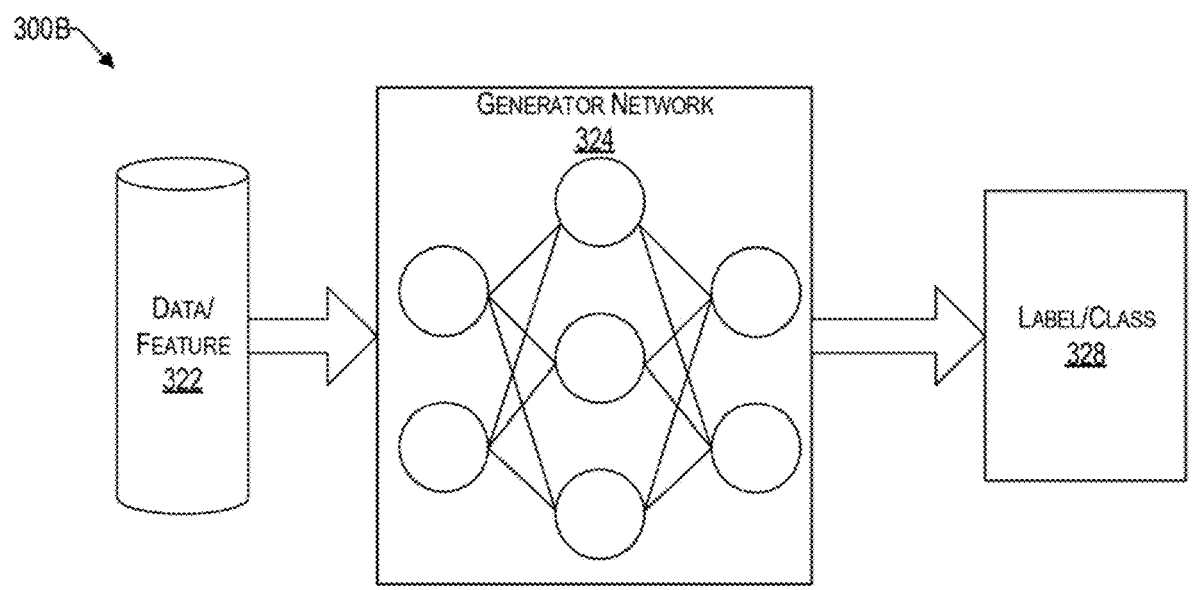

As to GANs, represented by generator network 324 in FIG. 3B, they are deep neural net architectures that include two nets, pitting one against the other (and thus the term "adversarial"). GANs have the capability to learn to mimic any distribution of data. Accordingly, a generator network 324 can create audio and visual content, including speech, image(s), music, etc., based on input data, represented by data/feature block 322. Stated differently, instead of predicting a label given certain features (as in discriminative architectures), the generator network 324 can predict features given a certain label. For example, when a rating (e.g., class) is assigned to a segment of the media content, the generator network 324 can use the class to generate features to adjust the actual rating of the scene to the assigned rating. Thus, the generator network 324 is configured to generate new data instances, while the discriminator network 304 evaluates the data for its authenticity.

Figure 4:
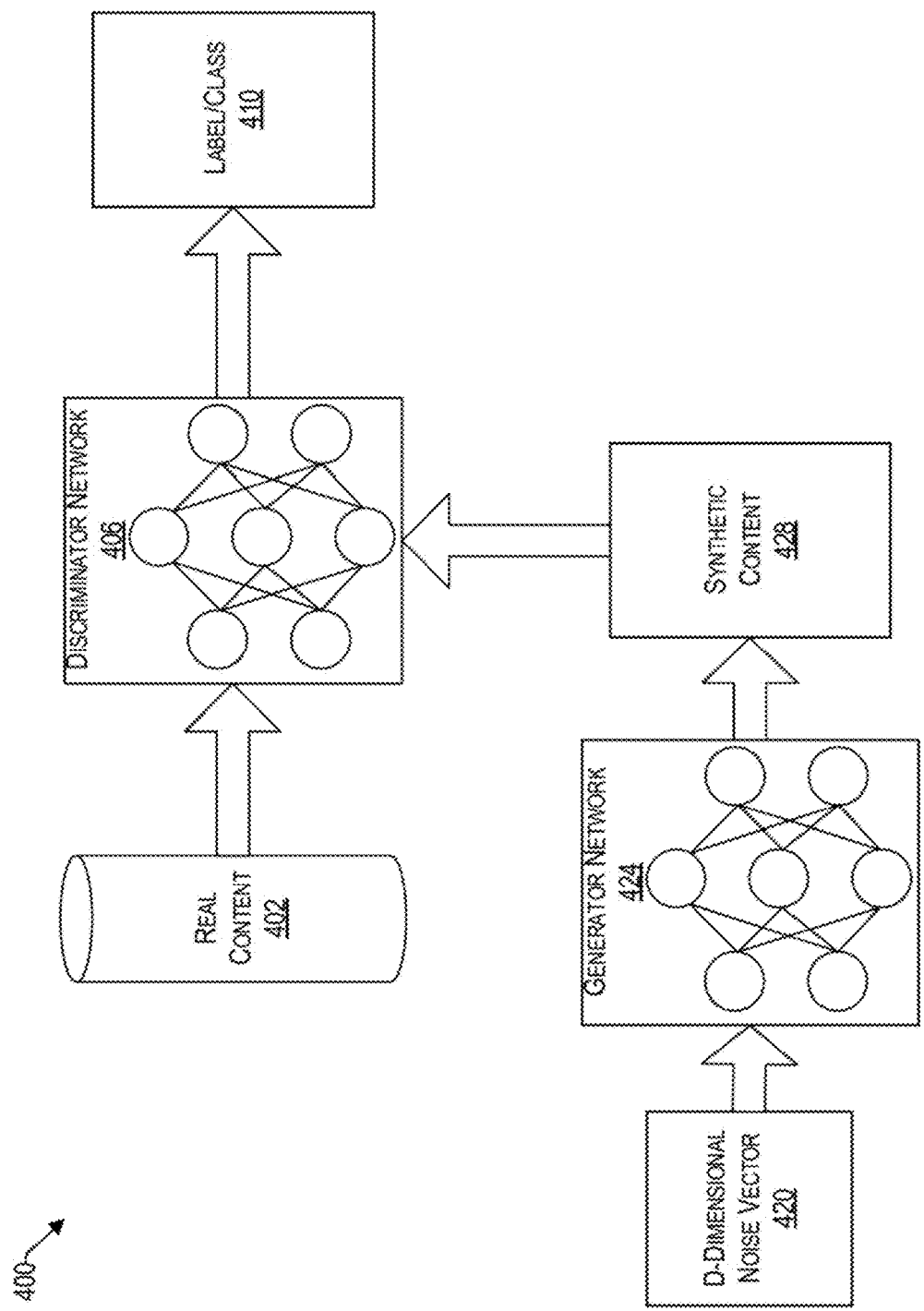
FIG. 4 is a conceptual block diagram of an example neural network that includes a generative adversarial network interacting with a discriminator network.

Reference now is made to FIG. 4, which is a conceptual block diagram of an example neural network 400 that includes a GAN 424 interacting with a discriminator network 406. For example, the generator network 424 can create new content for a segment of a media, referred to herein as synthetic content 428, to accommodate the identified members of the audience. The discriminator network 406 is configured to determine whether the synthetic content 428 sufficiently resembles the real content 402. The real content 402 represents the ground truth of the content, which can be used as a corpus of data for the discriminator network 406 to learn from. Upon review of the synthetic content 428, the discriminator, based on the reference real content 402, can provide a score (e.g., from 0 to 1, where 1 is the highest probability) regarding whether the synthetic content 428 generated by the generator network 424 is sufficient to be part of a predetermined label/classification 410, which represents the output layer.

Accordingly, both the generator network 424 and the discriminator network 406 are constantly learning, but optimizing opposing objective functions (i.e., loss functions). Upon determining that a segment of a media content should be adapted to accommodate a member of the audience having a most restricted class, the generator network 424 can use the segment as an input vector 420 and make adjustments thereto.

For example, the relevant feature of the content may be a knife. The generator network may inquire with a look-up table at a regulations database 112, and/or preferences stored in the CRM server 118, what an appropriate replacement would be (e.g., a flower). In this regard, the generator network 424 would replace that portion of the segment of the media content with a synthetic image of a flower to replace the knife.

Figure 5:
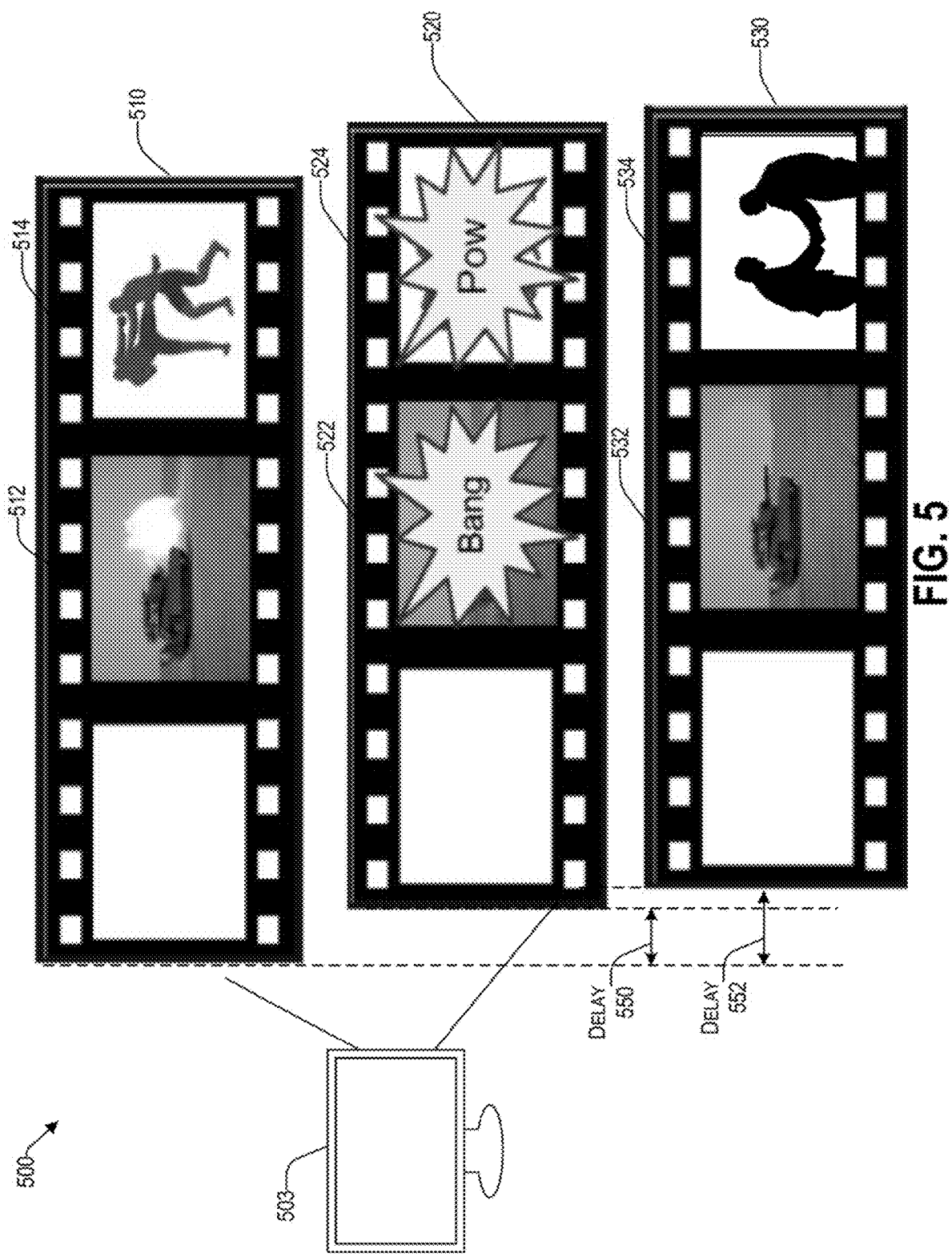
FIG. 5 illustrates a conceptual diagram of media segments being adapted in different ways, consistent with different embodiments.

In this regard, reference is made to FIG. 5, which illustrates a conceptual diagram of media segments being adapted in different ways, consistent with different embodiments. For example, the display 503 of a user device may identify the content in two segments of a media content 410 to be above a rating for a class of at least one member of the audience. The first relevant segment, comprising frames 2000 to 2200 (512) may relate to a tank firing artillery, while the second relevant segment 514 may relate to two individuals fighting. As discussed herein, various identification techniques, such as convolutional neural networks (CNN) and/or a discriminator network may be used for such determination. The user device can then adapt at least some portions of the content of the appropriate segment of the media content to accommodate the rating for the member of the audience having the highest restrictions. In one embodiment, the adaptation may be as simple as covering or obstructing visual content (cover or blur of the portions of the segment) as indicated in segments 522 and 524, and/or obstructing audio content (bleep or mute).

In other embodiments, adaptation of the content for the relevant segment includes generation of new (i.e., synthetic) images to replace the original content. To that end, a generator network may be used to use the original segment as a "noisy" input with instructions to replace the portion of the segment that is of concern with more appropriate content. For example, the regions of the segment indicating firing of the tank may be adapted to illustrate a non-firing tank, as indicated in segment 532, and the artillery fire is replaced with a tank gently traversing a terrain. Similarly, an image of two individuals in a combat can be adapted to indicate the same individuals shaking hands, as indicated in segment 534.

Different types of adaptation of content may be more time consuming than others. For example, if user preferences indicate that a simple obstruction of audio and/or visual is sufficient, then the delay 550 introduced may be relatively small (e.g., 1 second) between the original media content 510 being streamed and the adapted media content 520. However, if a more sophisticated adaptation is indicated in user preferences, which may include rendering/generation of synthetic images and/or sound, there may be a longer delay 552.

Thus, in one embodiment, the content engine driving the presentation device 503 may introduce an inherent delay to accommodate the adaptation of the media content. In some scenarios, the delay may increase as the media content progresses with complicated scenes. In this regard, the content engine may generate additional neutral content to gain time to be able to generate the appropriate audio and or visual media content. For example, if the generation of the of the content of the segment 532 may involve more delay 552 than originally allocated, then an existing scene is simply continued (e.g., the tank is continuing to move forward), thereby generating time to create the synthetic scene 532.

Example Process

Figure 6:
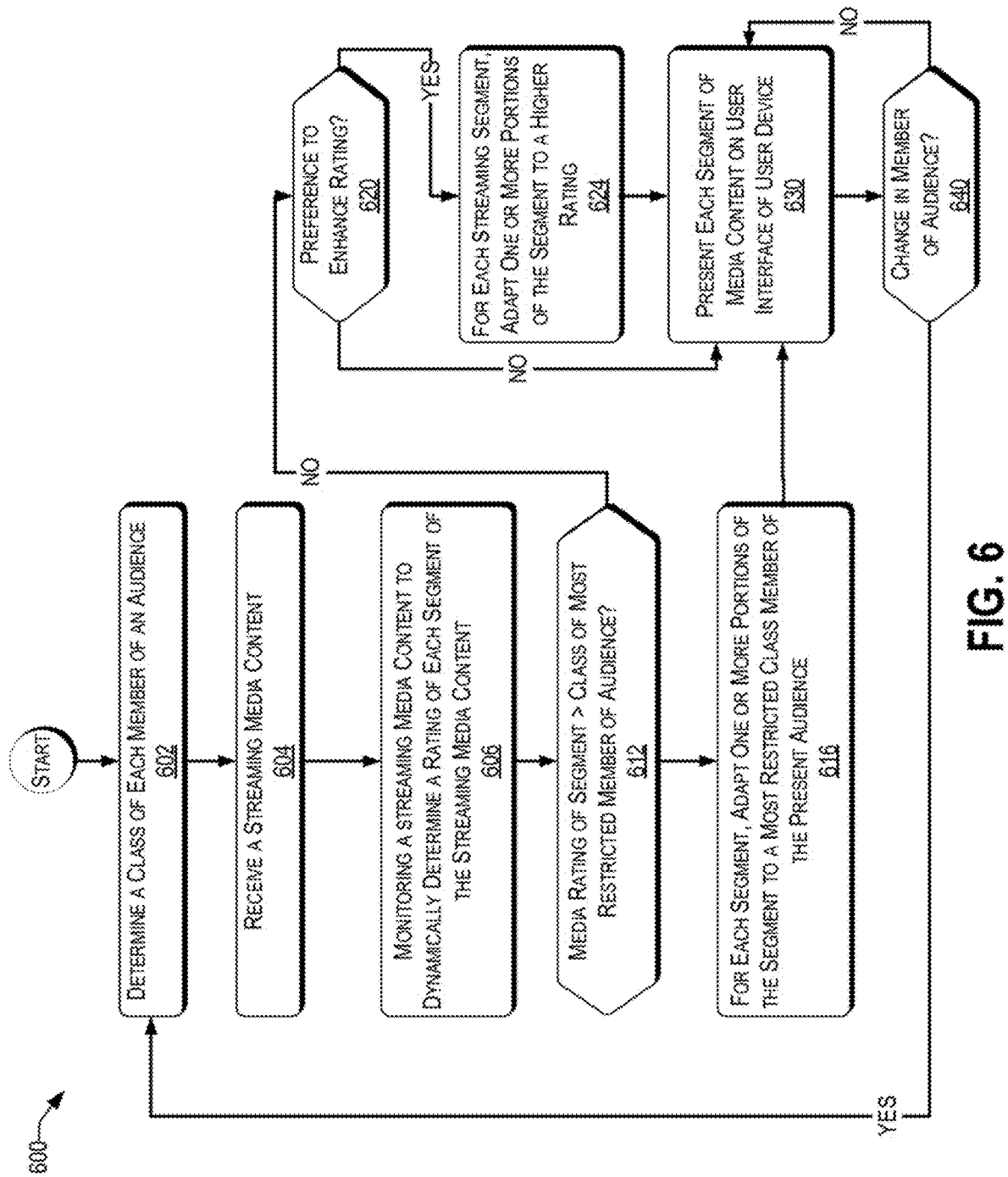
FIG. 6 presents an illustrative process for a dynamic scene by scene adaptation of media content based on the identified members of the audience.

With the foregoing overview of the architecture 100, example user device 200, and example artificial intelligence techniques, it may be helpful now to consider a high-level discussion of an example call flow process. To that end, FIG. 6 presents an illustrative process 600 for a dynamic scene by scene adaptation of media content based on identified members of the audience.

Process 600 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 600 is described with reference to the architecture 100 of FIG. 1.

At block 602, a class of each member of a present audience is determined by the content engine. In various embodiments, the content engine may be part of the user device, proximate to the user device, or part of a remote content engine server 120. When part of or proximate to the user device, one or more sensors (such as cameras and microphones) of the user device are used to determine one or more individuals who are within a viewing angle and/or an audio range of the user device. In scenarios where the content engine 132 is part of a remote content engine server 120, the sensors are part of the user device and the sensor data is transmitted to the content engine 132 over the network 106.

In some embodiments, the content engine determines an identity of one or more members of the audience. For example, the content engine can identify signature features in the voice and or face of an individual and compare them to a reference database where the user is registered.

The content engine may determine a class of each member of the present audience by referring to a reference database (e.g., regulations database 112). In one embodiment, the content engine determines the location of the user device, which may be provided from a GPS module of the user device. For each member of the present audience a class of a subject member of the audience can be retrieved, based on estimated age of the subject member of the present audience and the location of the user device.

At block 604, a streaming media content is received by the content engine. The streaming media content may be received from various media content sources, such as a terrestrial broadcaster, a cable or satellite television distribution system, or a company providing content for download over the Internet or other Internet Protocol (IP) based networks like an Internet service provider. In some embodiments, the content can be received from recorded media (e.g., hard drive, CD, DVD, Flash memory, etc.)

At block 606, the streaming media content is monitored by the content engine to dynamically determine a rating of each segment of the streaming media content.

At block 612, for each segment of the streaming media content, the content engine determines whether its rating is above the determined class of the most restricted member of the audience. If so, (i.e., "YES" at decision block 612), the process continues with block 616, where, for each segment, one or more portions of the segment are adapted to accommodate a class of the most restricted member of the audience. More particularly, reduce-rating is performed using the different techniques discussed herein.

At block 630, each segment of the media content is then presented on a user interface of the user device.

Returning to block 612, upon determining that the rating not the determined class of the most restricted member of the audience, (i.e., "NO" at decision block 612), the process continues with decision block 620, where the content engine determines whether the present members of the audience have indicated a preference to enhance-rating. If not (i.e., "NO" at decision block 620), the process continues with block 630.

However, upon determining that an enhanced-rating is desired (i.e., "YES" decision block 620), the process continues with block 624, where, for each streaming segment, one or more portions of the segment are adapted to a higher rating, sometimes referred to herein as enhance-rating. The process then continues with block 630.

In various embodiments, the user device can monitor the presence of the audience members at predetermined intervals or upon a trigger event (e.g., a member of the audience leaves the room, intermission, etc.), as indicated by block 640. If the status remains the same (i.e., "NO" at decision block 640), the process continues with block 630, where each segment continues to be presented on the user interface of the user device as before. However, if the status has changed (i.e., "YES" at decision block 640), the process returns to block 602, to continue the iterative process.

Example Computer Platform

Figure 7:
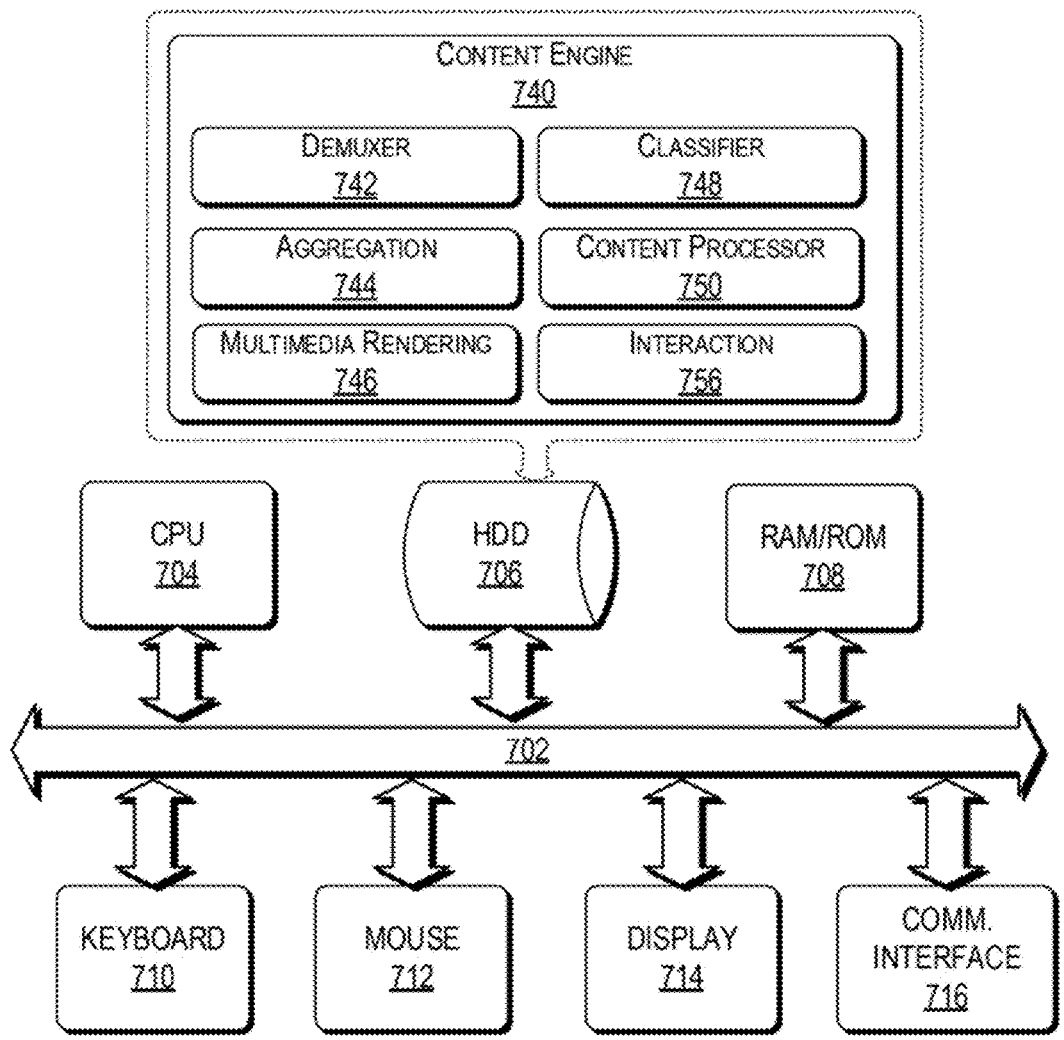
FIG. 7 is a functional block diagram illustration of a computer hardware platform such as a user device or a content engine server that can communicate with various networked components.

As discussed above, functions relating to identifying the rating of the content of different segments of a media content, identifying the class and/or identity of each member of the audience, and providing synthetic portions of the media content based on the identified class of each member of the audience, and other functions discussed herein, can be performed with the use of one or more computing devices connected for data communication via wireless or wired communication, as shown in FIG. 1. An example user device 200 in the form of a mobile device was discussed in the context of FIG. 2. FIG. 7 is a functional block diagram illustration of a computer hardware platform such as a user device or a content engine server 120 that can communicate with various networked components.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the content engine 740, in a manner described herein. The content engine 740 may have various modules configured to perform different functions.

In one embodiment, there is a demuxer module operative to demultiplex individual elementary streams of the media content and send them to their respective decoders for decoding. There may be a classification aggregation module 744 operative to identify the class of each audience member. There may be a multimedia rendering module 746 to present the adapted content that was synthetically created to meet the target audience rating (i.e., class) and/or their preferences. There may be a classifier module 748 operative to determine the classification of the content and the classification of each member of the audience. There may be a content processor and generation module 750 operative to create synthetic content in real-time based on generative models. There may be an interaction module 756 that is operative to interact with one or more computing devices and databases, such as media content database 110, regulations database 112, and the CRM 118.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A user device comprising:
   a processor;
   a network interface coupled to the processor to enable communication over a network;
   a user interface coupled to the processor;
   a storage device for content and programming coupled to the processor;
   a content engine stored in the storage device, wherein an execution of the content engine by the processor configures the user device to perform acts comprising:
   determining a class of each member of an audience of the user device;
   receiving a streaming media content;
   monitoring the streaming media content to dynamically determine a rating of each segment of the streaming media content;
   for each segment of the streaming media content:
      upon determining that a rating of a segment is above a class of a most restricted member of the audience:
         introducing a delay by generating neutral visual media content based on a time for an adaptation of one or more portions of the segment; and
         adapting the one or more portions of the segment to alter the rating of the segment to the class of the most restricted member of the audience by using a generative adversarial network (GAN) artificial intelligence (AI) to create synthetic content to replace the one or more portions of the segment; and
      presenting the segment of the media content on the user interface.

2. The user device of claim 1, wherein determining the class of each member of the audience comprises: using one or more sensors of the user device to determine one or more individuals within a viewing angle of a display of the user device.

3. The user device of claim 2, wherein:
   the one or more sensors include a camera that is configured to, for each member of the audience, extract physical features from a face of the member of the audience; and
   the physical features are used to perform a face recognition to determine the class of the member of the audience.

4. The user device of claim 2, wherein execution of the content engine further configures the user device to perform acts, comprising: upon determining that a member of the present audience has left at least one of (i) a viewing angle, and (ii) an audio range of the user device, returning to determining the class of each member of the audience of the user device.

5. The user device of claim 1, wherein determining the class of each member of the audience comprises: using one or more sensors of the user device to determine one or more individuals within an audible range of the user device.

6. The user device of claim 5, wherein determining the class of each member of the audience further comprises:
   extracting audio features from a recorded audio content of the audience member; and
   performing natural language processing (NLP) to the audio content.

7. The user device of claim 1, wherein the determination of the class of each member of the present audience is performed repeatedly during the presentation of the media content.

8. The user device of claim 1, wherein determining the rating for each member of the present audience comprises:
   determining a location of the user device; and
   for each member of the present audience, retrieving a rating from a regulations database, based on the determined class of the member and the determined location of the user device.

9. The user device of claim 1, wherein execution of the content engine further configures the user device to perform acts, comprising:
   using one or more sensors of the user device to extract at least one of (i) physical features, and (ii) audio features of the member of the audience; and
   identifying the member of the audience by comparing at least one of the extracted features to a signature stored in a reference database.

10. The user device of claim 1, wherein adapting one or more portions of the segment to the most restricted class member comprises at least one of: (i) blocking the one or more portions of the segment, and (ii) obscuring the one or more portions of the segment.

11. The user device of claim 1, wherein determining a rating of each segment of the streaming media content comprises using a discriminator network to classify the segment.

12. The user device of claim 1, wherein execution of the content engine further configures the user device to perform acts, comprising: upon determining that a rating of a segment is below the class of a most restricted member of the audience, adapting one or more portions of the segment to enhance its content to a higher rating.

13. A non-transitory computer readable storage medium tangibly embodying a computer readable program code having computer readable instructions that, when executed, causes a user device to carry out a method of dynamically adapting a streaming media content, the method comprising:
   determining a class of each member of an audience of the user device;
   receiving the streaming media content;
   monitoring the streaming media content to dynamically determine a rating of each segment of the streaming media content;
   for each segment of the streaming media content:
      upon determining that a rating of a segment is above a class of a most restricted member of the audience:
         introducing a delay by generating neutral visual media content based on a time for an adaptation of one or more portions of the segment; and
         adapting the one or more portions of the segment to alter the rating of the segment to the class of the most restricted member of the audience by using a generative adversarial network (GAN) artificial intelligence (AI) to create synthetic content to replace the one or more portions of the segment; and
      presenting the segment of the media content on a display of a user device.

14. The non-transitory computer readable storage medium of claim 13, wherein determining the class of each member of the audience comprises: using one or more sensors of the user device to determine one or more individuals within a viewing angle of a display of the user device.

15. The non-transitory computer readable storage medium of claim 14, further comprising:
   upon determining that a member of the present audience has left at least one of (i) a viewing angle, and (ii) an audio range of the user device, returning to determining the class of each member of the audience of the user device.

16. The non-transitory computer readable storage medium of claim 13, wherein determining the class of each member of the audience comprises:
   using one or more sensors of the user device to determine one or more individuals within an audible range of the user device;
   extracting audio features from a recorded audio content of the audience member; and
   performing natural language processing (NLP) to the audio content.

17. The non-transitory computer readable storage medium of claim 13, further comprising:
   using one or more sensors of the user device to extract at least one of (i) physical features, and (ii) audio features of the member of the audience; and
   identifying the member of the audience by comparing at least one of the extracted features to a signature stored in a reference database.

18. The non-transitory computer readable storage medium of claim 13, wherein determining a rating of each segment of the streaming media content comprises using a discriminator network to classify the segment.

* * * * *